United States Patent [19]

Currence

[11] 4,398,231
[45] Aug. 9, 1983

[54] SOLID-STATE ELECTRONIC BRUSH SPEED SENSING CONTROL

[75] Inventor: Evan J. Currence, Rochester, Minn.

[73] Assignee: Lake Center Industries, Winona, Minn.

[21] Appl. No.: 354,199

[22] Filed: Mar. 3, 1982

Related U.S. Application Data

[63] Continuation of Ser. No. 135,005, Mar. 31, 1980, abandoned.

[51] Int. Cl.³ .............................................. H02H 7/08
[52] U.S. Cl. ........................................ 361/23; 361/118; 361/239; 361/241; 361/381; 15/391
[58] Field of Search ................ 361/23, 33, 118, 120, 361/117, 119, 56, 51, 24, 381, 239, 241; 15/391, 390, 319, 327 R; 318/461, 463, 464

[56] References Cited

U.S. PATENT DOCUMENTS

| | | | |
|---|---|---|---|
| 3,403,395 | 9/1968 | Gundry et al. | 361/381 X |
| 3,435,290 | 3/1969 | Lyman | 361/118 X |
| 3,648,166 | 3/1972 | Redecker et al. | 361/118 X |
| 3,668,465 | 6/1972 | Evans et al. | 361/118 X |
| 3,676,742 | 7/1972 | Russell et al. | 361/117 X |
| 3,917,981 | 11/1975 | Keen | 361/118 X |
| 3,940,665 | 2/1976 | Seki | 361/381 X |
| 4,163,999 | 8/1979 | Eaton | 361/23 |
| 4,245,370 | 1/1981 | Baker | 361/23 X |

*Primary Examiner*—Patrick R. Salce
*Attorney, Agent, or Firm*—Kinzer, Plyer, Dorn & McEachran

[57] ABSTRACT

This is concerned with a solid-state electronic brush speed sensing control for sensing the rotational speed of the brush in a vacuum cleaner, either of the canister or upright type, so that as the brush slows down or stops due to being jammed or partially jammed by a foreign object, such as a sock or the like, the drive motor will be disconnected from its source of power thereby protecting the brush, the motor, the belts, etc.

1 Claim, 5 Drawing Figures

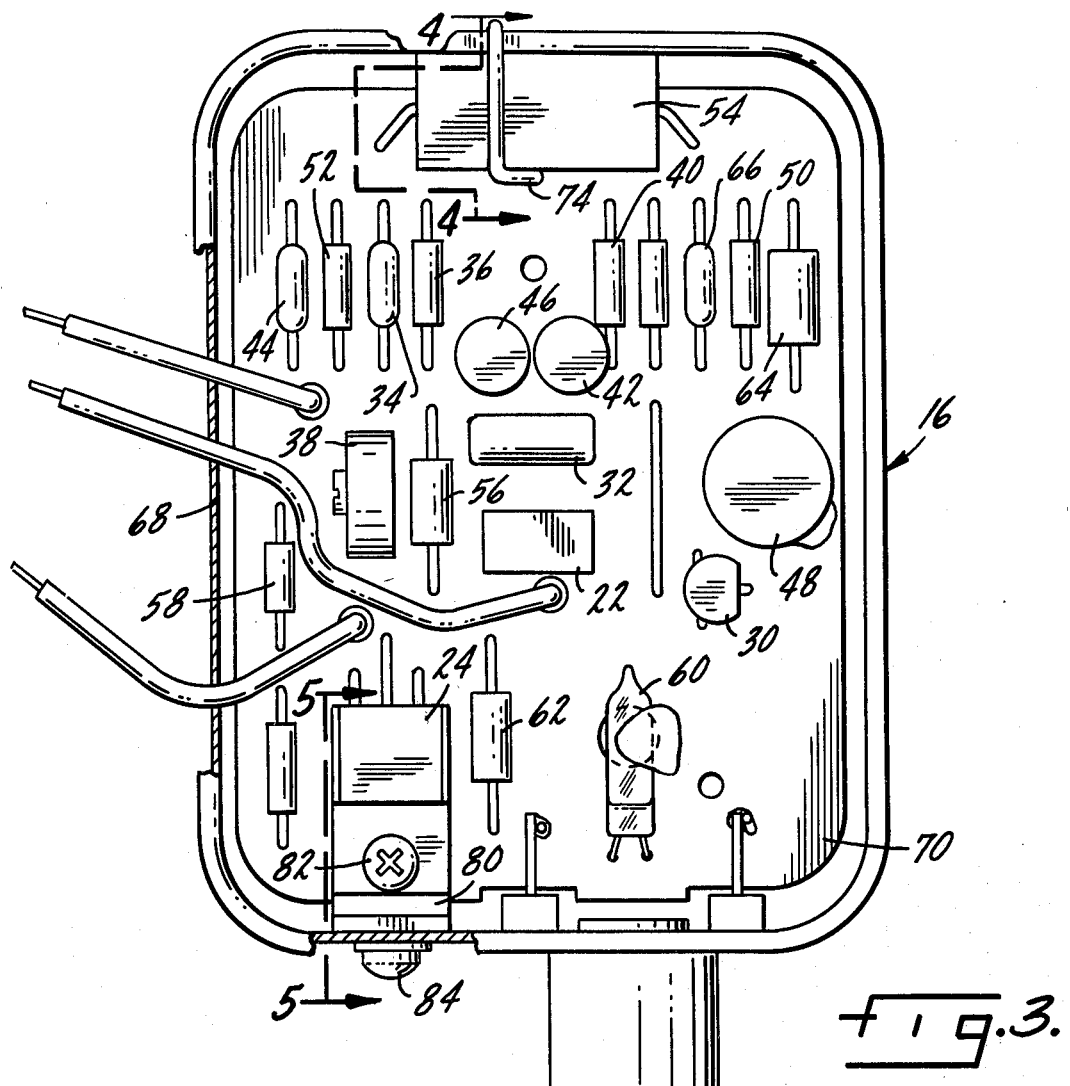
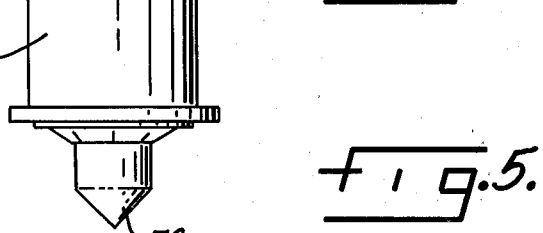
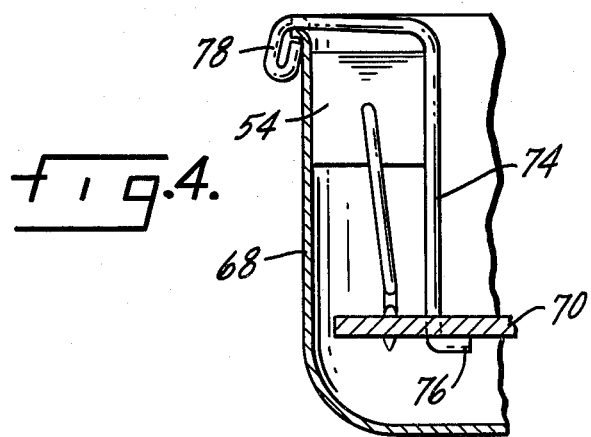
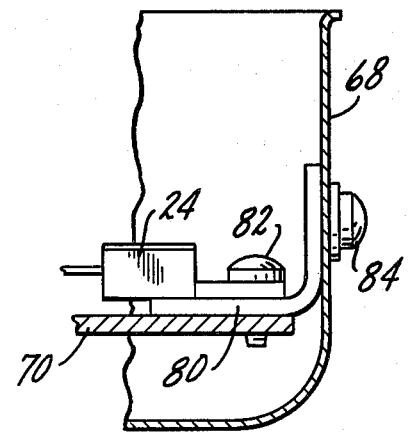

SOLID-STATE ELECTRONIC BRUSH SPEED SENSING CONTROL

This is a continuation, of application Ser. No. 135,005, filed Mar. 31, 1980; now abandoned.

SUMMARY OF THE INVENTION

This invention is concerned with a solid-state electronic brush speed sensing control for use in vacuum cleaners and is more specifically concerned with sensing the rotational speed of the beater brush in either a canister or upright vacuum cleaner so that when the speed slows down to a predetermined level from its normal operative speed, for example the intervention of a child's sock or what have you, a circuit will be energeized or deenergized which will turn the motor off so that the motor, drive belt, beater brush, etc. will all be protected, i.e. will be deenergized.

A primary object is a circuit of the above type which ensures precise tripout at a selected brush tripout speed which means that the brush does not have to come to a complete stop.

Another object is a circuit of the above type with built in hysteresis so that the circuit will tripout at a preselected tripout speed which is lower than the normal operative speed of the brush and will not come back on until the brush speed is increased to its normal operating speed thereby preventing erratic operation.

Another object is a circuit of the above type which is constructed to prevent erratic operation or hunting around the selected tripout speed.

Another object is a circuit of the above type which is specifically designed to compensate for variations in line voltage.

Another object is a circuit in a module with a metallic housing and a spark gap that provides protection for dissipating static charges built up in a unit of this type without sparking across in other areas.

Another object is a module of the above type for use in a vacuum cleaner which has improved heat dissipation features.

Another object is a circuit of the above type having a pickup coil mounted on the metal housing for optimum signal transfer to the sensing circuit.

Another object is a circuit of the above type which can be calibrated so that the tripout speed can be accurately selected.

Other objects will appear from time to time in the ensuing specification and drawings.

BRIEF DESCRIPTION OF THE DRAWINGS

FIG. 3 is a top view of the control module;

FIG. 4 is a section, on an enlarged scale, along line 4—4 of FIG. 3; and

FIG. 5 is a section, on an enlarged scale, along line 5—5 of FIG. 3.

DESCRIPTION OF THE PREFERRED EMBODIMENT

Figure 1:
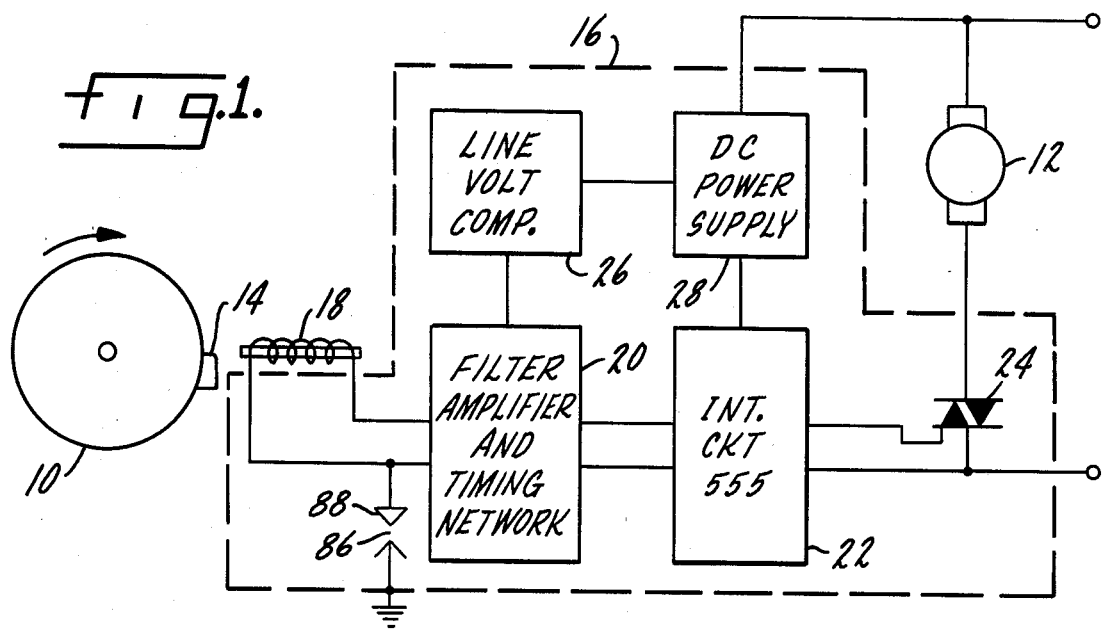
FIG. 1 is a block diagram showing the circuit in combination with a beater bar or rotor or brush and a drive motor therefor.

In FIG. 1 a rotating beater bar or brush on a vacuum cleaner has been indicated generally at 10 with its drive motor at 12. The drive belt between the two has not been shown. The schematic showing of the beater brush and drive motor may be assumed to be in either a canister or an upright vacuum cleaner. As is conventional the beater bar brush carries a permanent magnet 14 so rotation of the beater bar may be sensed by a control indicated generally at 16 on the beater brush which includes a pickup coil diagrammatically indicated at 18 opposite the permanent magnet which in turn is connected to a filter amplifier and timing network 20 which in turn is connected to an integrated circuit 22 which functions as a level detector to in turn operate a triac 24 which energizes or trips out the motor 12. The control also includes a line voltage compensator 26 and a DC power supply 28.

Figure 2:
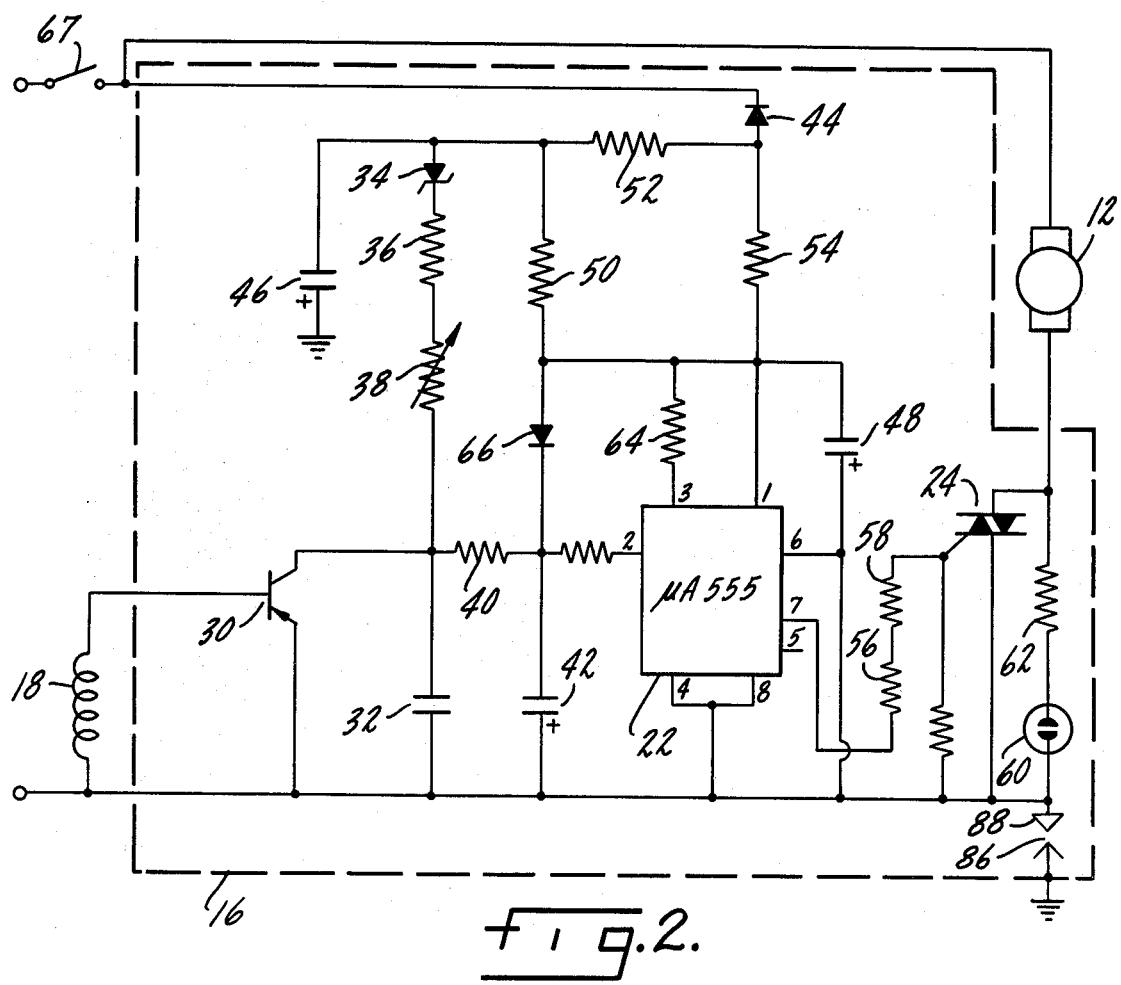
FIG. 2 is the control circuit.

Referring to FIG. 2, pulses in the coil 18, created by the permanent magnet in the beater bar, are fed to the base of a transistor 30. These pulses turn on the transistor 30 allowing a capacitance 32 to discharge. The capacitance 32 is normally charged to, for example 15 volts, through a zener diode 34, resistance 36 and variable resistor 38. The amount of charge on capacitor 32 is greater if the beater bar is turning more slowly in that the discharge pulses from the transistor 30 are less frequent.

The pulses on capacitance 32 are filtered by a resistor 40 and capacitor 42 which gives a DC voltage on capacitor 32 which is inversely proportional to the speed of the beater bar. This can be calibrated by adjustable resistor 38 so that it can be set at whatever threshold voltage is desired, for example 8 volts.

The integrated circuit 22 designated $\mu$A555 is of the type that is normally used as a timer and in this case is being used as a level detector and can be purchased from Fairchild Semi-Conductor Components which is a part of Fairchild Camera and Instrument Corp. and is referred to by Fairchild as a linear integrated circuit or a single timing circuit. There are a large number of other manufacturers from which an integrated circuit of this type known as a 555 unit may be purchased.

The DC power supply 28 in FIG. 1 is made up of a diode 44 in FIG. 2, capacitances 46 and 48 and resistors 50, 52 and 54 which supply a certain voltage to pin 1 on the integrated circuit 22, for example 12 volts. When the voltage on pin 2 supplied from the filter, amplifier and timing network exceeds a certain percentage of the DC power supply on pin 1, for example $\frac{2}{3}$, the output from the integrated circuit on pin 7 will drop to 0. In the example given where the DC power supply provides 12 volts to pin 1, the threshold voltage on pin 2 would be 8 volts.

The output voltage on pin 7 drives the triac motor switch 24 through resistors 56 and 58. When the output on pin 7 drops to 0 the triac motor switch 24 will open thereby shutting the motor 12. At the same time a neon light 60, as protected by a resistor 62, will come on and there will still be current through the motor 12 but it will not be sufficient to drive it.

Resistors 56 and 58 can be ratioed to resistor 64 so that the circuit will have built in hysteresis to prevent it from hunting around the tripout speed. For example, the normal operative speed of the brush might be considered to something on the order of 3000 rpm and the tripout speed could be set at something like 2400 rpm. By proper ratioing of resistors 56 and 58 to resistor 64, once the beater bar drops below the tripout speed, it will not come back on until the brush speed is increased back up to approximately the normal running speed, i.e. 3000 rpm which is to say that the unit is latched to 3000 rpm. This will prevent hunting or erratic operation around the 2400 rpm tripout speed. Once the unit trips out and the motor 12 stops, diode 66 will dissipate the charge from capacitor 42 so that when the power is reapplied it will take something on the order of a half a second to a second before the control can trip out again. This thus ensures that the unit can reach the operating speed of, say, 3000 rpm before the control can trip out. The entire circuit may be turned "off" and "on" by a main switch 67 which is normally manually operated.

In FIGS. 3 through 5 the housing or module 16 has been shown and may include a surrounding metallic housing 68 which is in the form of a dish which may be open on top but with an integral bottom panel. All of the components are mounted on a PC board 70 which is spaced up from the bottom of the housing somewhat and with the coil 18 projecting from the front with a core 72 which may be spaced from but directed toward the permanent magnet 14 on the beater bar. The PC board 70 is not a good heat conductor and both the power resistor 54 and the triac switch 24 generate a substantial amount of heat. So the power resistor 54 has been mounted up from the PC Board 70 against the inside of the metallic housing so as to be in heat transfer relationship therewith and is held in place by a wire type bracket 74 with hooks through the PC board at 76 and over the rim of the housing at 78. Thus the power resistor 54, which generates a substantial amount of heat, is raised above the PC board 70 and is placed in direct heat transfer relationship with the metal housing which aids cooling.

At the other end the triac 24 is mounted on a generally L-shaped metal bracket 80 by a suitable screw 82 or the like with the other leg thereof extending upwardly and connected to the inside of the housing by a similar screw 84 or the like. The result is that the triac, which also generates a substantial amount of heat, is placed in metal-to-metal contact with the housing so that good heat transfer will take place. Also, the triac is at the opposite end of the housing from the power resistor 54 so that all of the heat transfer takes place at opposite ends and the maximum amount of the housing is used to dissipate heat.

The coil 18 is mounted on the outside of the metal housing which ensures that the circuit will have optimum signal transfer to the sensing circuit which is influenced by the flux line cutting through the housing of the module.

The use, operation and function of the invention are as follows:

I provide a small module which can be easily mounted in a conventional vacuum cleaner either of the canister or upright type which will sense the speed of the beater bar or brush and when it is reduced substantially, for example by a sock becoming jammed in the unit, will cut off all power to the motor. This protects the motor and also whatever drivetrain is used between the beater bar and the motor, for example a rubber belt or the like.

The trip speed when the module will shut down the motor can be set at any desired level and it is preferred that it be substantially below the normal operating speed of the motor and beater bar. The examples given of 3000 rpm as the normal operating speed for the beater bar and 2700 rpm as a suggested trip speed are merely examples and they could be otherwise.

The unit has the specific advantage that it provides automatic compensation for variations in line voltage which can vary from time to time somewhat from the intended 110 volts. This is accomplished by the zener diode 34. The change in line voltage will cause a percentage change in the voltage supplied to the zener diode 34 by the DC power supply 28. For example, when the DC power supply 28 is supplying 40 volts to the zener diode for a line voltage of 120, if the line voltage goes up to 130 the voltage from the DC power supply 28 will go up by the same percentage. But the zener diode 34 will only allow a fixed voltage change so that loading on capacitance 32 will vary more than that percentage. This is to say that the zener diode transmits the actual voltage change and not a percentage. The result is that the zener diode translates a larger line voltage change to the timing network 20 than the change in the DC power supply to the integrated circuit 22. The result is that the beater bar must turn faster to prevent the filter voltage from exceeding the trip voltage to the integrated circuit 22 and accordingly the trip speed is increased.

The low pass filter which is resistor 40 and capacitance 42 are interposed between the pickup coil and the triac gate trigger circuit 24. This ensures precise tripout at the selected beater bar speed and the brush or beater bar does not have to come to a complete stop for a tripout to occur. The circuit also has built in hysteresis which ensures that hunting will not take place. When tripout occurs and the unit shuts down the operator will flip the switch 67 on the vacuum cleaner to "off." Thus all power is cut out. Diode 66 takes the charge off of capacitance 42 when the power is off. Then when the operator flips the switch and reapplies power, there is a certain time constant built in (resistor 36, 38 and 40, and capacitor 42) before the unit will trip out again.

Additionally the unit or module has a metallic housing with a fixed spark gap 86, for example 1/16", which is less than the gap between the various other components, and a copper foil track 88 is provided to ensure a good ground. The advantage of this is that static electricity that will be built up on a unit of this nature in use will be harmlessly discharged to the metallic housing and will protect the circuit components. Additionally the power resistor 54 and triac 24 which are heat generating are fastened to the metal enclosure or housing for greatly improved heat dissipation.

While the preferred form and several variations of the invention have been shown and suggested, it should be understood that suitable additional modifications, changes, substitutions and alterations may be made without departing from the invention's fundamental theme.

The embodiments of the invention in which an exclusive property or privilege is claimed are defined as follows:

1. For use in a vacuum cleaner having a suction head and means for drawing air and entrained material through the head with a brush rotatably mounted in the head for loosening material on a surface being cleaned to cause entrainment thereof in the drawn air and a drive including an electric motor for rotating the brush at a normal operative speed with a connection for connecting the motor to a source of AC electric power, the improvement comprising a control for disconnecting the motor from the electric power source, the control including means for sensing the rotational speed of the brush, means for disconnecting the motor from the electric power source when the brush is rotating at a predetermined tripout speed well below its normal operative speed, and means for automatically varying the predetermined tripout speed in direct relation to variations in the voltage from the source of electric power, the automatic varying means including means for converting the AC power from the electric power source to DC power so as to provide a DC power supply for the control, and a zener diode connected between the DC power supply and the sensing means for the rotational speed of the brush.

* * * * *